United States Patent
Tamaoka et al.

(10) Patent No.: US 9,316,229 B2
(45) Date of Patent: Apr. 19, 2016

(54) MOTOR AND FAN

(71) Applicant: NIDEC CORPORATION, Kyoto (JP)

(72) Inventors: Takehito Tamaoka, Kyoto (JP); Kazuhiko Fukushima, Kyoto (JP); Hiroaki Hirano, Kyoto (JP); Kouta Kabune, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 337 days.

(21) Appl. No.: 13/785,768

(22) Filed: Mar. 5, 2013

(65) Prior Publication Data

US 2013/0323093 A1 Dec. 5, 2013

(30) Foreign Application Priority Data

May 30, 2012 (JP) ................................. 2012-122945

(51) Int. Cl.
| | |
|---|---|
| F04D 25/06 | (2006.01) |
| H02K 11/00 | (2006.01) |
| H02K 3/52 | (2006.01) |
| H02K 5/22 | (2006.01) |

(52) U.S. Cl.
CPC ........ *F04D 25/0613* (2013.01); *F04D 25/0633* (2013.01); *F04D 25/0646* (2013.01); *H02K 3/522* (2013.01); *H02K 5/225* (2013.01); *H02K 11/0094* (2013.01); *H02K 2211/03* (2013.01)

(58) Field of Classification Search
CPC . F04D 17/16; F04D 25/0613; F04D 25/0633; F04D 25/08; F04D 29/40; F04D 29/4226; F04D 29/424; F04D 29/4246; H02K 3/522; H02K 5/225; H02K 2211/03
USPC .......................................... 417/410.1, 423.14
See application file for complete search history.

(56) References Cited

U.S. PATENT DOCUMENTS

| | | | | |
|---|---|---|---|---|
| 6,545,379 | B2* | 4/2003 | Gomyo | 310/68 R |
| 8,072,101 | B2* | 12/2011 | Ho | 310/67 R |
| 8,157,540 | B2* | 4/2012 | Aoki | F04D 29/4213 361/695 |
| 8,382,450 | B2* | 2/2013 | Ida et al. | 417/354 |
| 8,879,204 | B2* | 11/2014 | Sekii | G11B 25/043 310/71 |

(Continued)

FOREIGN PATENT DOCUMENTS

| | | |
|---|---|---|
| CN | 101505074 A | 8/2009 |
| CN | 102312845 A | 1/2012 |

(Continued)

OTHER PUBLICATIONS

English Translation of JP2007166851 A.*

*Primary Examiner* — Nathan J Newhouse
*Assistant Examiner* — Connor Tremarche
(74) *Attorney, Agent, or Firm* — Westerman, Hattori, Daniels & Adrian, LLP

(57) ABSTRACT

A base plate of a motor includes an inner bottom plate portion and an elevated portion. A land portion is arranged on an upper surface of a portion of a circuit board which overlaps with the inner bottom plate portion in a plan view, or on a portion of the circuit board which overlaps with the elevated portion in the plan view. A conducting wire extending from a coil is electrically connected to the land portion. This structure enables the conducting wire to be connected to the land portion on the circuit board without the conducting wire being drawn outward beyond an outer circumferential end portion of the base plate. The axial position of the conducting wire connected to the land portion and the axial position of the base plate at least partially overlap with each other.

11 Claims, 13 Drawing Sheets

(56) References Cited

U.S. PATENT DOCUMENTS

| | | | |
|---|---|---|---|
| 2007/0128052 A1* | 6/2007 | Moriya et al. | 417/354 |
| 2007/0194641 A1* | 8/2007 | Kanatani | H02K 3/522 310/71 |
| 2007/0247010 A1* | 10/2007 | Ichizaki | H02K 3/522 310/71 |
| 2009/0195095 A1 | 8/2009 | Yawata et al. | |
| 2010/0231068 A1* | 9/2010 | Yamazaki | H02K 3/522 310/71 |
| 2010/0303647 A1* | 12/2010 | Ida et al. | 417/352 |
| 2010/0329104 A1 | 12/2010 | Yawata et al. | |
| 2011/0122530 A1 | 5/2011 | Sekii et al. | |
| 2012/0113791 A1 | 5/2012 | Yawata et al. | |
| 2012/0113792 A1 | 5/2012 | Yawata et al. | |
| 2012/0156022 A1 | 6/2012 | Otsuki et al. | |
| 2012/0201670 A1* | 8/2012 | Takeshita | F04D 29/522 415/212.1 |
| 2013/0050872 A1 | 2/2013 | Sekii et al. | |
| 2013/0050874 A1 | 2/2013 | Yawata et al. | |

FOREIGN PATENT DOCUMENTS

| | | | |
|---|---|---|---|
| CN | 102969840 A | | 3/2013 |
| JP | 2007-166851 A | | 6/2007 |
| JP | 2007166851 A | * | 6/2007 |
| JP | 2008-5588 A | | 1/2008 |
| JP | 2009-189157 A | | 8/2009 |
| JP | 2011-114892 A | | 6/2011 |
| JP | 2012-013067 A | | 1/2012 |
| JP | 2013-066358 A | | 4/2013 |

* cited by examiner

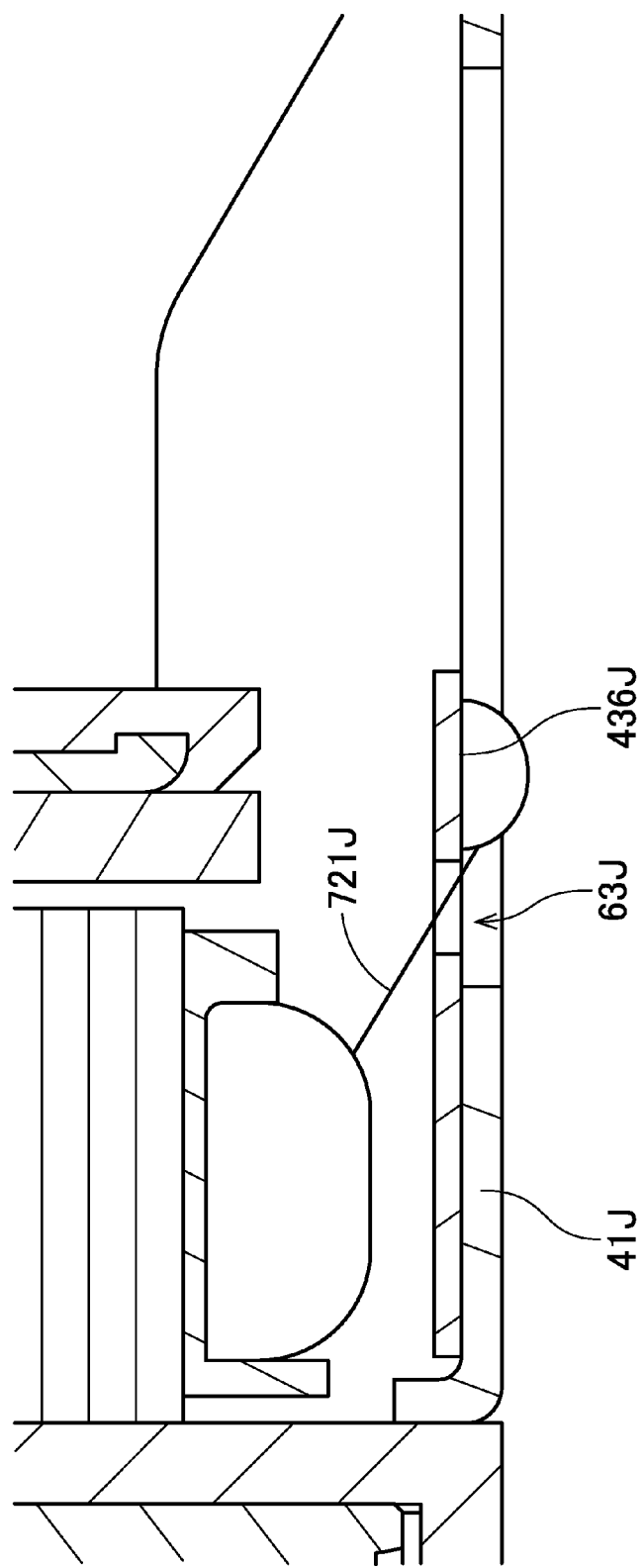

MOTOR AND FAN

BACKGROUND OF THE INVENTION

1. Field of the Invention

The present invention relates to a motor and a fan.

2. Description of the Related Art

Centrifugal fans used for internal cooling have often been installed in electronic devices, such as notebook personal computers. Such a centrifugal fan is arranged to rotate an impeller with a driving force generated by a motor to produce an air current inside a case of an electronic device. Electronic components, such as a CPU, which are arranged inside the case are thereby cooled. A notebook personal computer typically includes a hard disk drive and an optical disk drive. Spindle motors arranged to rotate disks are installed in these drives.

The structures of known motors are described, for example, in JP-A 2007-166851 and JP-A 2008-005588.

In recent years, with an increasing reduction in the thickness of the notebook personal computers, there has been a strong demand for a reduction in the thickness of the centrifugal fans and the spindle motors arranged in the notebook personal computers. However, in the case where a circuit board is arranged on an upper surface of a base plate, and conducting wires drawn from coils are soldered to an upper surface of the circuit board, for example, the thickness of the base plate, the thickness of the circuit board, and the thickness of a solder are simply added up to result in a large combined axial thickness. It is therefore difficult to achieve a reduction in the axial thickness of the motor with the above structure.

In this connection, in the motor described in JP-A 2007-166851, an end portion to of a conducting wire is drawn out to a space radially outside a bracket and on a back side of a circuit board, and is soldered and connected to a land arranged on the back side of the circuit board and radially outside a cut defined in the circuit board. This structure is able to reduce the axial thickness of the motor to an extent to which the axial position of the bracket and the axial position of the solder overlap with each other.

However, in the motor described in JP-A 2007-166851, the conducting wire extending from a coil is drawn to a position radially outside an outer circumferential end portion of the bracket, and is soldered to the land. This structure results in an increased radial dimension of the motor although a reduction in the axial thickness of the motor is achieved.

SUMMARY OF THE INVENTION

A motor according to a preferred embodiment of the present invention includes a stationary portion and a rotating portion supported by the stationary portion through a bearing mechanism, and arranged to rotate about a central axis extending in a vertical direction. The rotating portion includes a magnet in which magnetic poles are arranged in a circumferential direction, or a plurality of magnets arranged in the circumferential direction. The stationary portion includes an armature including coils arranged around the central axis; a base plate arranged below the armature to support the bearing mechanism; and a circuit board arranged on an upper surface or a lower surface of the base plate. The base plate includes an inner bottom plate portion arranged to extend in directions away from the central axis below the armature; an elevated portion arranged to extend in the directions away from the central axis radially outside and above the inner bottom plate portion; and a junction portion arranged to join an outer edge of the inner bottom plate portion and an inner edge of the elevated portion to each other. The circuit board includes a land portion to which a conducting wire extending from any of the coils is electrically connected. The land portion is arranged on an upper surface of a portion of the circuit board which overlaps with the inner bottom plate portion in a plan view, or on a portion of the circuit board which overlaps with the elevated portion in the plan view.

A fan according to a preferred embodiment of the present invention includes a stationary portion; a rotating portion supported by the stationary portion through a bearing mechanism, and arranged to rotate about a central axis extending in a vertical direction; an impeller arranged to rotate together with the rotating portion; and a casing arranged to accommodate the rotating portion and the impeller. The rotating portion includes a magnet in which magnetic poles are arranged in a circumferential direction, or a plurality of magnets arranged in the circumferential direction. The stationary portion includes an armature including coils arranged around the central axis; a base plate arranged below the armature to support the bearing mechanism; and a circuit board arranged on an upper surface or a lower surface of the base plate. The base plate includes an air hole arranged to pass through the base plate in an axial direction, and a cut arranged to extend radially inward from the air hole. The circuit board includes a land portion to which a conducting wire extending from any of the coils is electrically connected. An axial position of the conducting wire connected to the land portion and an axial position of the cut are arranged to at least partially overlap with each other.

According to the above-described preferred embodiments of the present invention, the conducting wire is connected to the land portion on the circuit board without being drawn outward beyond an outer circumferential end portion of the base plate. Moreover, the axial position of the conducting wire connected to the land portion and the axial position of the base plate at least partially overlap with each other. This contributes to effective use of a space in the axial direction. This in turn contributes to reducing the axial thickness of the motor.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a vertical cross-sectional view of a motor according to a first preferred embodiment of the present invention.

FIG. 2 is a vertical cross-sectional view of a centrifugal fan according to a second preferred embodiment of the present invention.

FIG. 3 is a partial vertical cross-sectional view of the centrifugal fan according to the second preferred embodiment.

FIG. 4 is a top view of a base plate and a circuit board according to the second preferred embodiment.

FIG. 5 is a top view of the base plate according to the second preferred embodiment.

FIG. 6 is a top view of a base plate and a circuit board according to a modification of the second preferred embodiment.

FIG. 7 is a top view of a base plate and a circuit board according to a modification of the second preferred embodiment.

FIG. 8 is a top view of a base plate according to a modification of the second preferred embodiment.

FIG. 13 is a partial vertical cross-sectional view of a centrifugal fan according to a modification of the second preferred embodiment.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a motor is referred to by the term "axial direction", "axial", or "axially", that directions perpendicular to the central axis of the motor are referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which an armature is arranged with respect to a base plate is defined as an upper side. The shape of each member or portion and relative positions of different members or portions will be described based on the above assumptions. It should be noted, however, that the above definitions of the vertical direction and the upper side are not meant to restrict in any way the orientation of a motor or a fan according to any preferred embodiment of the present invention when in use.

Also note that the wording "parallel direction" as used herein comprehends substantially parallel directions. Also note that the wording "perpendicular direction" as used herein comprehends substantially perpendicular directions.

1. First Preferred Embodiment

Figure 1:
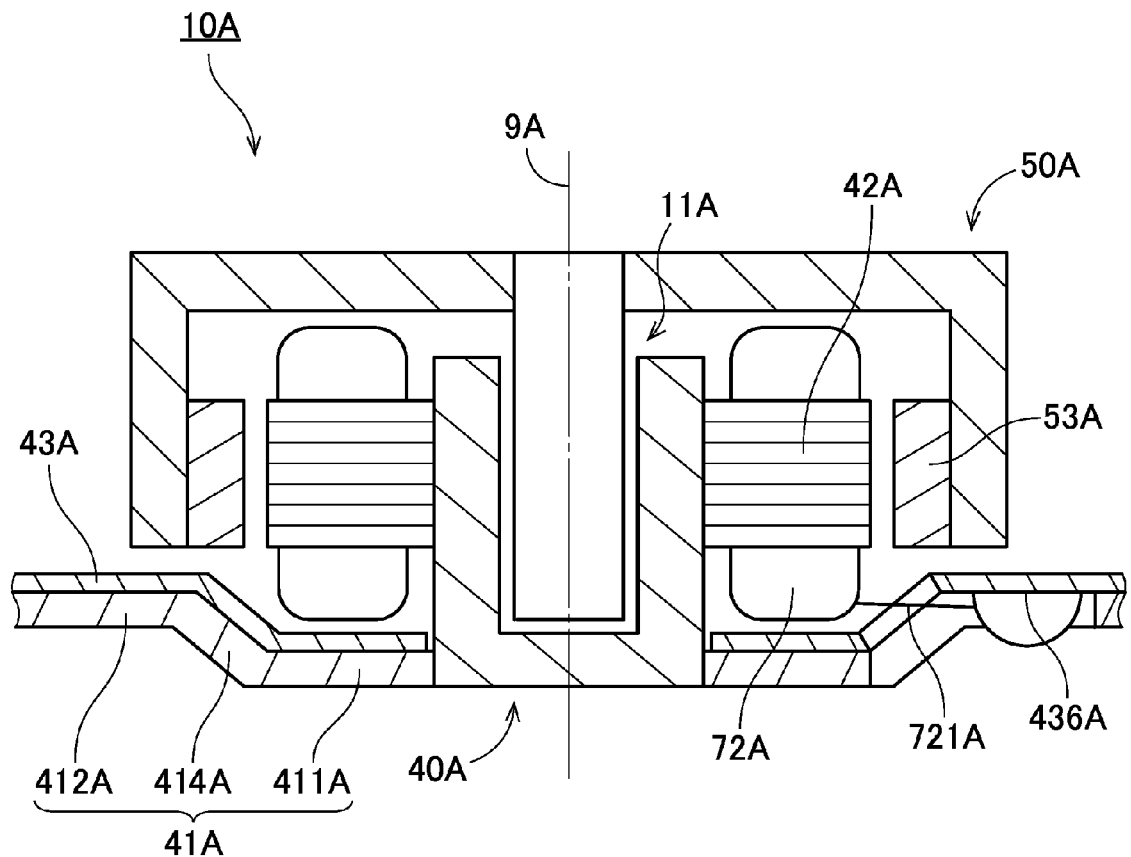

FIG. 1 is a vertical cross-sectional view of a motor 10A according to a first preferred embodiment of the present invention. Referring to FIG. 1, the motor 10A includes a stationary portion 40A and a rotating portion 50A. The rotating portion 50A is supported by the stationary portion 40A through a bearing mechanism 11A, and is arranged to rotate about a central axis 9A. In addition, the rotating portion 50A includes a magnet 53A in which magnetic poles are arranged in a circumferential direction.

The stationary portion 40A includes a base plate 41A, an armature 42A, and a circuit board 43A. The armature 42A includes coils 72A arranged around the central axis 9A. The base plate 41A is arranged below the armature 42A. In addition, the base plate 41A is arranged to support the bearing mechanism 11A. The circuit board 43A is arranged on an upper surface of the base plate 41A.

The base plate 41A includes an inner bottom plate portion 411A, an elevated portion 412A, and a junction portion 414A. The inner bottom plate portion 411A is arranged to extend in directions away from the central axis 9A below the armature 42A. The elevated portion 412A is arranged to extend in the directions away from the central axis 9A radially outside and above the inner bottom plate portion 411A. The junction portion 414A is arranged to join an outer edge of the inner bottom plate portion 411A and an inner edge of the elevated portion 412A to each other.

In the present preferred embodiment, a land portion 436A is arranged on a lower surface of a portion of the circuit board 43A which overlaps with the elevated portion 412A in a plan view. Then, a conducting wire 721A extending from one of the coils 72A is electrically connected to the land portion 436A. That is, in the present preferred embodiment, the conducting wire 721A is connected to the land portion 436A on the circuit board 43A without being drawn outward beyond an outer circumferential end portion of the base plate 41A.

Moreover, in the present preferred embodiment, the axial position of the conducting wire 721A connected to the land portion 436A and the axial position of the base plate 41A are arranged to partially overlap with each other as illustrated in FIG. 1. This contributes to effective use of a space in the axial direction. This in turn contributes to reducing the axial thickness of the motor 10A.

Note that the circuit board 43A may be arranged on a lower surface of the base plate 41A. Also note that the land portion 436A may be arranged on an upper surface of a portion of the circuit board 43A which overlaps with the inner bottom plate portion 411A in the plan view.

2. Second Preferred Embodiment

2-1. Structure of Centrifugal Fan

Figure 2:
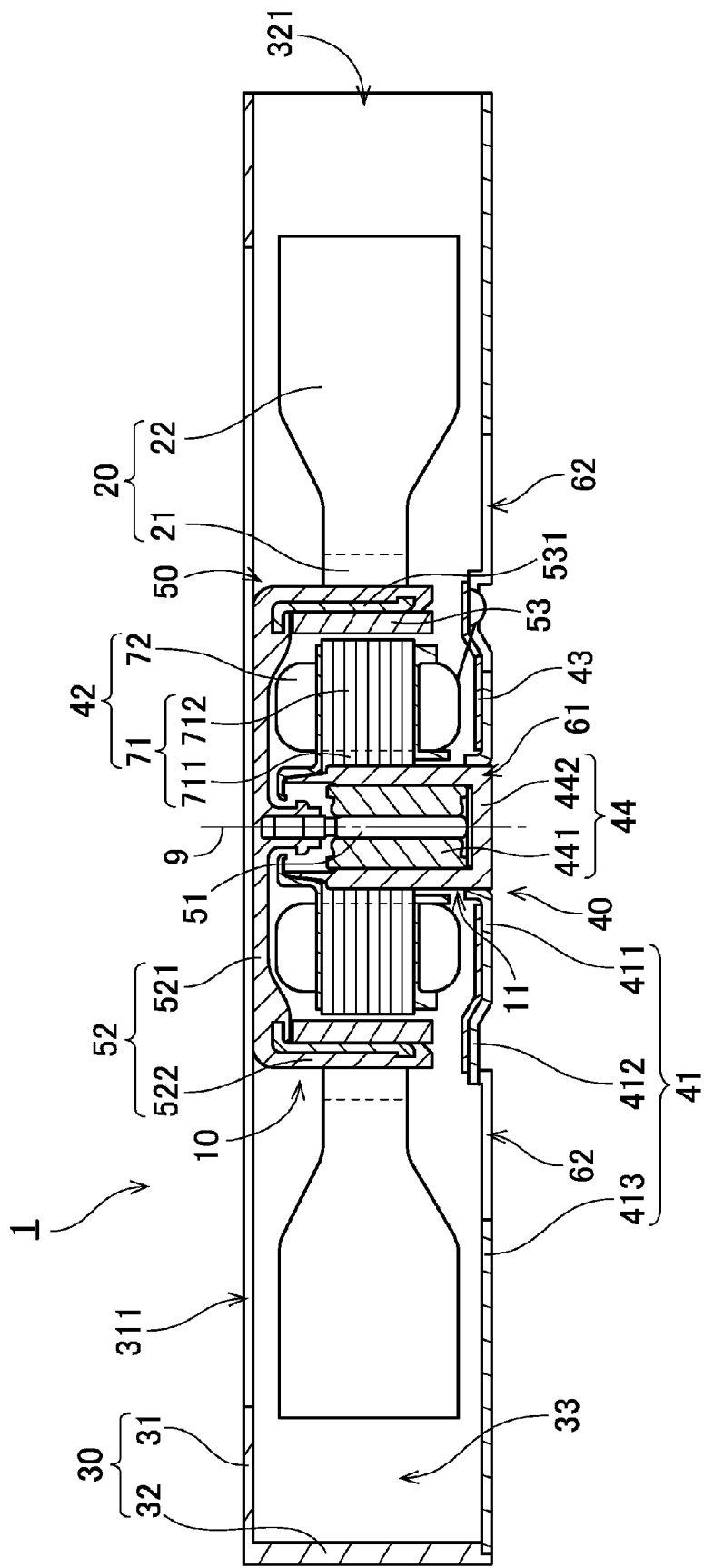

Next, a second preferred embodiment of the present invention will now be described below. FIG. 2 is a vertical cross-sectional view of a centrifugal fan 1 according to the second preferred embodiment. The centrifugal fan 1 is installed in an electronic device, such as a notebook personal computer or a tablet personal computer, and is used to produce air currents for internal cooling. Note that fans according to other preferred embodiments of the present invention may be used to produce air currents for other purposes than cooling. Also note that fans according to other preferred embodiments of the present invention may be installed in household electrical appliances other than personal computers, transportation equipment, such as automobiles, medical appliances, and so on.

Referring to FIG. 2, the centrifugal fan 1 according to the present preferred embodiment includes a motor 10, an impeller 20, and a casing 30. The motor 10 is a mechanism arranged to produce a torque in accordance with drive currents to rotate the impeller 20. The motor 10 includes a stationary portion 40 and a rotating portion 50. The stationary portion 40 is stationary relative to the casing 30. The rotating portion 50 is supported by the stationary portion 40 through a bearing mechanism 11.

The stationary portion 40 includes a base plate 41, an armature 42, a circuit board 43, and a sleeve unit 44.

The base plate 41 is arranged to extend below the armature 42, a rotor holder 52, a plurality of magnets 53, and the impeller 20 to substantially assume the shape of a plate. The base plate 41 includes an inner bottom plate portion 411, an elevated portion 412, and an outer bottom plate portion 413. The inner bottom plate portion 411 is arranged to extend in directions away from a central axis 9 below the armature 42. The elevated portion 412 is arranged to extend in the directions away from the central axis 9 radially outside and above the inner bottom plate portion 411. The outer bottom plate portion 413 is arranged to extend in the directions away from the central axis 9 radially outside and below the elevated portion 412.

That is, the base plate 41 includes the elevated portion 412 between the inner and outer bottom plate portions 411 and 413, the elevated portion 412 being elevated above the inner and outer bottom plate portions 411 and 413. Moreover, in the present preferred embodiment, the inner and outer bottom plate portions 411 and 413 are arranged to be substantially flush with each other. The base plate 41 is produced, for example, by subjecting a metal such as a galvanized steel sheet to press working.

Furthermore, referring to FIG. 2, the base plate 41 includes one circular hole 61 and a plurality of lower air holes 62. The circular hole 61 is arranged to pass through the base plate 41 in the axial direction radially inside the inner bottom plate portion 411. The circular hole 61 is arranged to be substantially coaxial with the central axis 9. Each of the lower air holes 62 is arranged to pass through the base plate 41 in the axial direction radially outside the elevated portion 412.

The armature 42 includes a stator core 71 and a plurality of coils 72. The stator core 71 is defined, for example, by laminated steel sheets, e.g., electromagnetic steel sheets placed one upon another in the axial direction. The stator core 71 includes an annular core back 711 and a plurality of teeth 712. The core back 711 is fixed to an outer circumferential surface of a sleeve housing 442, which will be described below. The teeth 712 are arranged to extend radially outward from the core back 711 in a radial manner. Each coil 72 is defined by a conducting wire wound around a separate one of the teeth 712. The teeth 712 and the coils 72 are arranged at substantially regular intervals in the circumferential direction around the central axis 9.

The circuit board 43 is fixed to an upper surface of the base plate 41 through, for example, an adhesive. A flexible printed circuit board, which is flexibly bendable, is used as the circuit board 43 according to the present preferred embodiment. The circuit board 43 is arranged to extend along upper surfaces of both the inner bottom plate portion 411 and the elevated portion 412. Electronic circuits are mounted on both an upper surface and a lower surface of the circuit board 43 to supply the drive currents to the coils 72.

The sleeve unit 44 includes a sleeve 441 and the sleeve housing 442. The sleeve 441 is arranged to extend in the axial direction to assume a substantially cylindrical shape around a shaft 51, which will be described below. An inner circumferential surface of the sleeve 441 is arranged radially opposite an outer circumferential surface of the shaft 51. The sleeve housing 442 is a member having a bottom and being substantially tubular, and is arranged to accommodate the sleeve 441. The sleeve housing 442 is press fitted in the circular hole 61 of the base plate 41, and is thus supported by the base plate 41.

The rotating portion 50 includes the shaft 51, the rotor holder 52, and the magnets 53.

The shaft 51 is arranged to extend in the axial direction along the central axis 9 to assume a columnar shape. A lower portion of the shaft 51 is inserted in the sleeve 441. An upper end portion of the shaft 51 is arranged to project above an upper end portion of the sleeve 441. The shaft 51 is made, for example, of a metal such as stainless steel.

A lubricating fluid is arranged in a gap defined between the shaft 51 and a combination of the sleeve 441 and the sleeve housing 442. The shaft 51 is supported through the lubricating fluid to be rotatable with respect to the sleeve 441 and the sleeve housing 442. That is, in the motor 10, the sleeve 441, the sleeve housing 442, and the shaft 51 are arranged to together define the bearing mechanism 11, i.e., a fluid dynamic bearing mechanism, which is arranged to join the stationary and rotating portions 40 and 50 to each other such that the rotating portion 50 is rotatable relative to the stationary portion 40. A polyolester oil or a diester oil, for example, is used as the lubricating fluid.

The rotor holder 52 includes a circular plate portion 521 and a cylindrical portion 522. The circular plate portion 521 is arranged to extend in the directions away from the central axis 9 above the armature 42. A central portion of the circular plate portion 521 is fixed to the upper end portion of the shaft 51. The cylindrical portion 522 is arranged to extend downward from an outer end portion of the circular plate portion 521 to assume a substantially cylindrical shape. The rotor holder 52 is made, for example, of a resin.

The magnets 53 are fixed to an inner circumferential surface of the cylindrical portion 522 through a yoke 531 made of a magnetic material. An inner circumferential surface of each magnet 53 is a pole surface to be radially opposed to an end surface of each of the teeth 712. The magnets 53 are arranged at regular intervals in the circumferential direction such that north and south pole surfaces alternate with each other.

The impeller 20 includes an annular impeller base portion 21 and a plurality of blades 22. The impeller base portion 21 is fixed to an outer circumferential surface of the cylindrical portion 522 of the rotor holder 52. The blades 22 are arranged at regular intervals in the circumferential direction. Each blade 22 is arranged to extend radially outward from the impeller base portion 21. The impeller base portion 21 and the blades 22 are produced as a single piece by a resin injection molding process, for example. Note that the impeller base portion 21 and the blades 22 may be defined by separate members.

The casing 30 includes a top plate portion 31 and a side wall portion 32. The top plate portion 31 is arranged to extend in the directions away from the central axis 9 above the impeller 20. The side wall portion 32 is arranged to extend downward from an outer end portion of the top plate portion 31. A lower end portion of the side wall portion 32 is joined to an outer end portion of the base plate 41. The rotating portion 50 of the motor 10 and the impeller 20 are accommodated in an interior space of a case made up of the base plate 41 and the casing 30.

Referring to FIG. 2, the top plate portion 31 includes an upper air hole 311 arranged to pass therethrough in the vertical direction. The upper air hole 311 is arranged above the motor 10 and the impeller 20, and is arranged to be substantially coaxial with the central axis 9. In addition, the side wall portion 32 includes an air outlet 321 arranged to bring an interior and an exterior of the casing 30 into radial communication with each other.

Once the drive currents are supplied to the coils 72 through the circuit board 43, magnetic flux is generated around each of the teeth 712 of the stator core 71. Then, a circumferential torque is produced by interaction between the magnetic flux of the teeth 712 and that of the magnets 53, so that the rotating portion 50 and the impeller 20 are caused to rotate about the central axis 9.

During rotation of the impeller 20, gases are drawn into the casing 30 from spaces above and below the centrifugal fan 1 through the upper and lower air holes 311 and 62. The gases drawn into the casing 30 receive centrifugal forces caused by the impeller 20, and are caused to flow in the circumferential direction in a wind channel 33 defined between the impeller 20 and the side wall portion 32. The gases travel from the wind channel 33 to the air outlet 321, and are thereafter discharged sideways out of the centrifugal fan 1 through the air outlet 321.

2-2. Connection of Conducting Wires

Figure 3:
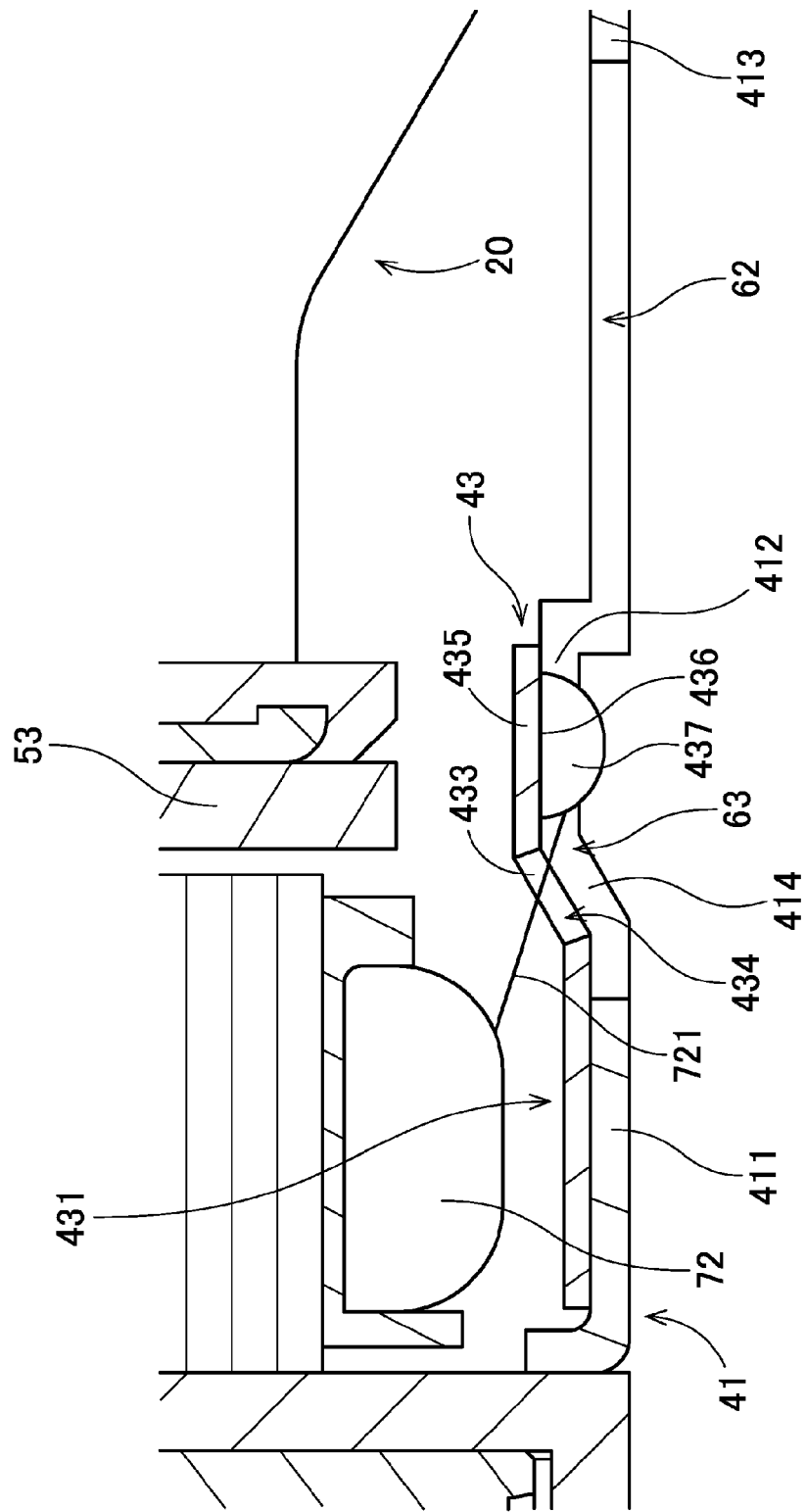
Figure 4:
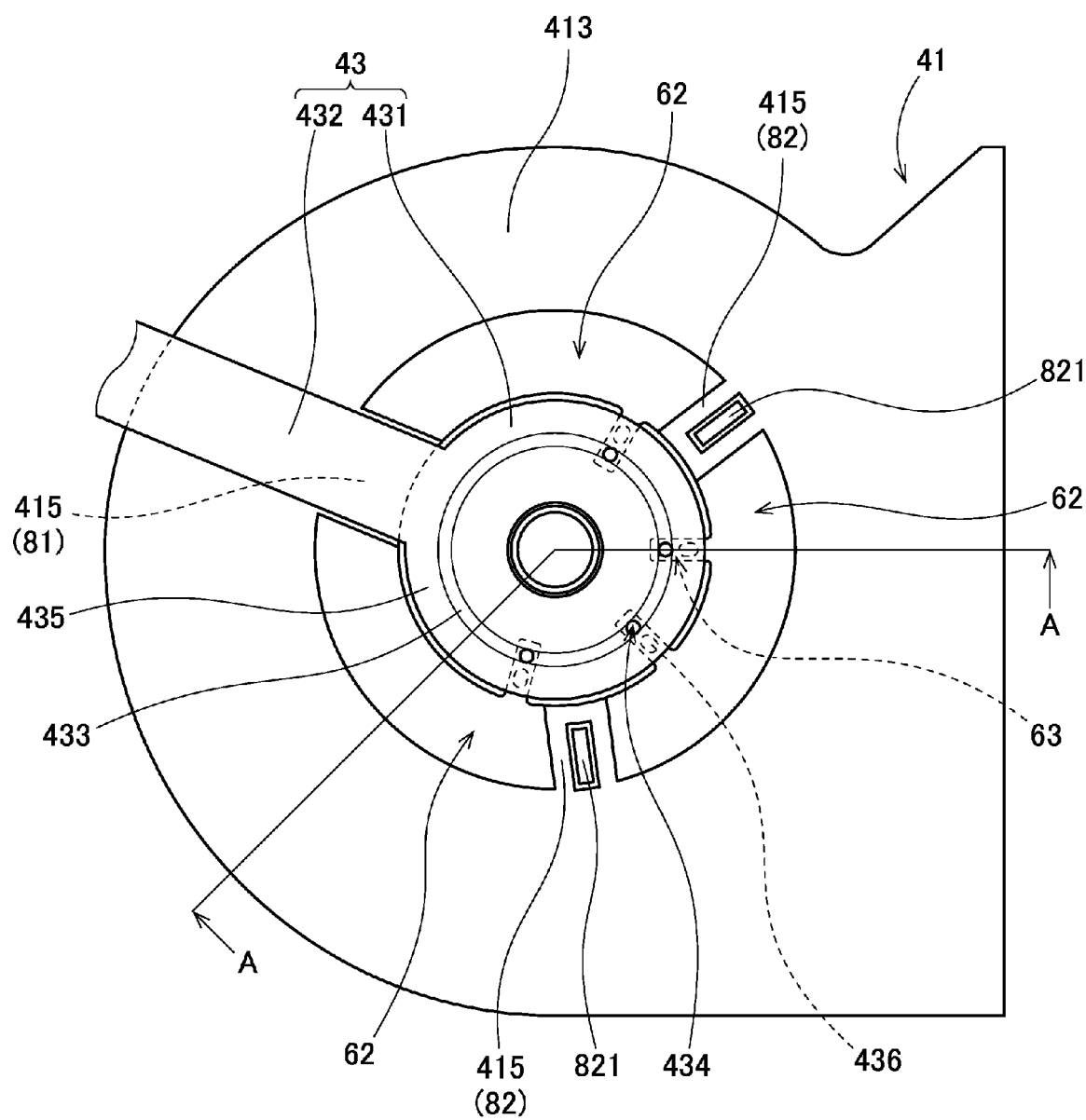
Figure 5:
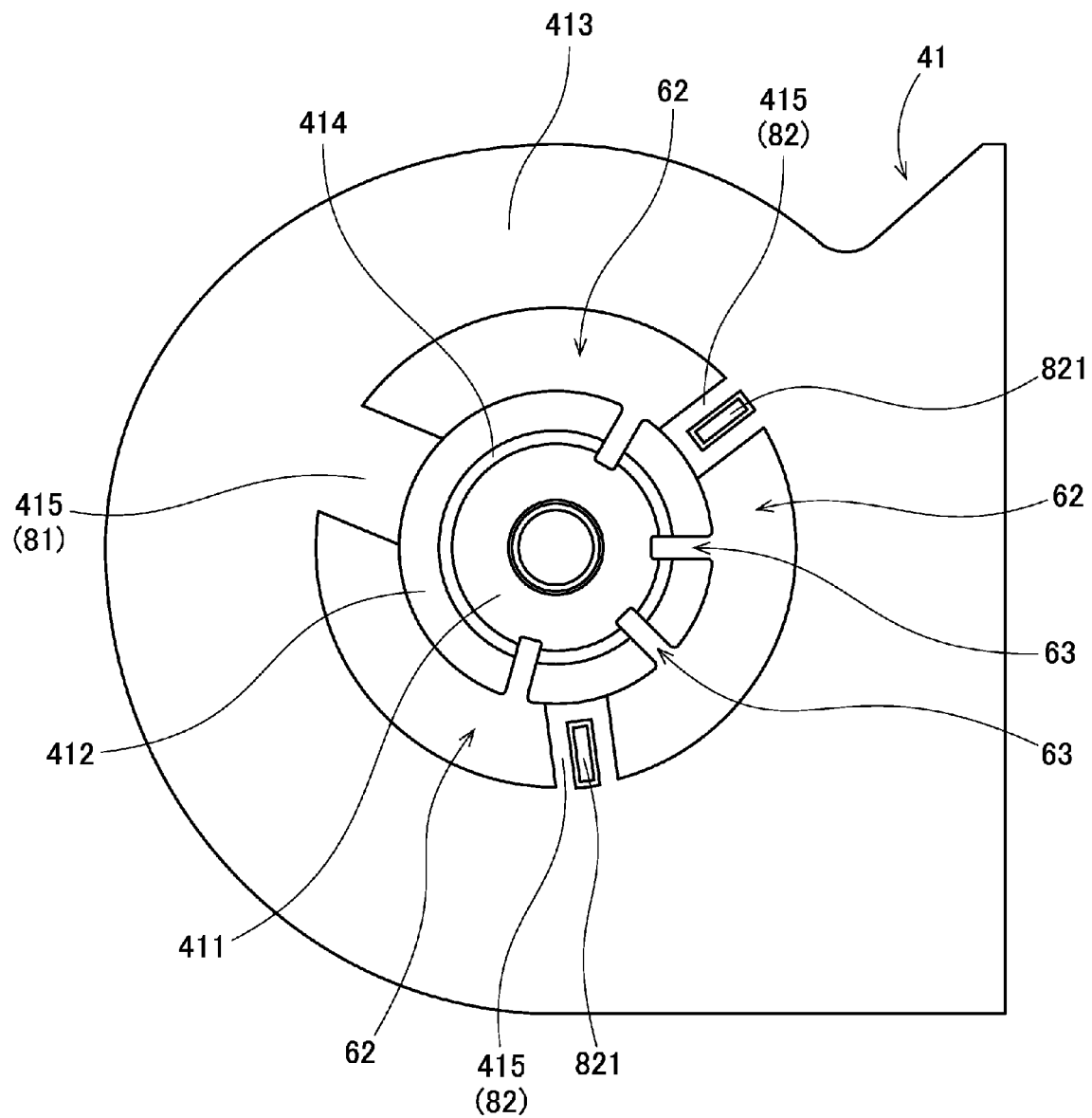

Next, a manner in which connection of the conducting wires between the coils 72 and the circuit board 43 is achieved will now be described below. FIG. 3 is a partial vertical cross-sectional view of the centrifugal fan 1. FIG. 4 is a top view of the base plate 41 and the circuit board 43. FIG. 5 is a top view of the base plate 41. Note that sections of the base plate 41 and the circuit board 43 illustrated in FIGS. 2 and 3 are taken along line A-A in FIG. 4.

As described above, the base plate 41 includes the inner bottom plate portion 411, the elevated portion 412, and the outer bottom plate portion 413. Referring to FIG. 5, each of the inner bottom plate portion 411 and the elevated portion 412 is arranged to extend in a substantially annular shape centered on the central axis 9. In addition, referring to FIGS. 3 and 5, the base plate 41 includes a substantially annular junction portion 414 arranged to join an outer edge of the inner bottom plate portion 411 and an inner edge of the elevated portion 412 to each other. The junction portion 414 is arranged to extend obliquely so as to increase in level with increasing distance from the central axis 9.

Moreover, referring to FIGS. 4 and 5, the base plate 41 according to the present preferred embodiment includes the lower air holes 62, which are three in number, and three ribs 415. The three lower air holes 62 are arranged in the circumferential direction. Each of the three ribs 415 is arranged to join the inner and outer bottom plate portions 411 and 413 to each other in a radial direction between circumferentially adjacent ones of the lower air holes 62.

Furthermore, referring to FIGS. 3 to 5, the base plate 41 includes four cuts 63. Each cut 63 is arranged to extend radially inward from a radially inner edge portion of one of the lower air holes 62. That is, the base plate 41 according to the present preferred embodiment includes through holes each of which includes one of the lower air holes 62 and one or two of the cuts 63 continuous with each other. Each cut 63 is arranged to extend in the radial direction while crossing both the elevated portion 412 and the junction portion 414. A radially inner end portion of each cut 63 is arranged to reach the inner bottom plate portion 411.

Meanwhile, referring to FIG. 4, the circuit board 43 includes an inner board portion 431 and an outer board portion 432. The inner board portion 431 is arranged radially inward of the lower air holes 62, and is arranged on the upper surfaces of the inner bottom plate portion 411, the junction portion 414, and the elevated portion 412. Moreover, the inner board portion 431 is arranged to have a large circumferential extent, and is arranged to extend in an annular shape according to the present preferred embodiment. The outer board portion 432 is arranged to extend radially outward from the inner board portion 431.

The three ribs 415 according to the present preferred embodiment include one first rib 81 and two second ribs 82. The outer board portion 432 is arranged to extend radially outward from an inner end of the first rib 81 along an upper surface of the first rib 81. Each of the two second ribs 82 is arranged to be away from the outer board portion 432. In addition, in the present preferred embodiment, each second rib 82 is arranged to have a circumferential width smaller than that of the first rib 81. A decrease in the circumferential width of each second rib 82 contributes to increasing the circumferential width of each lower air hole 62.

Moreover, referring to FIGS. 3 and 4, the inner board portion 431 includes an inclined portion 433 arranged above the junction portion 414. The inclined portion 433 is arranged to extend obliquely along the upper surface of the junction portion 414. Furthermore, referring to FIGS. 3 and 4, the circuit board 43 includes four outlets 434. Each outlet 434 is arranged to pass through the inclined portion 433 in the axial direction at a position overlapping with a separate one of the cuts 63 in a plan view.

Furthermore, the inner board portion 431 includes an upper plate portion 435 arranged to extend radially outward from a radially outer edge portion of the inclined portion 433. The upper plate portion 435 is arranged to overlap with the elevated portion 412 in the plan view. A lower surface of the upper plate portion 435 includes four land portions 436. In the present preferred embodiment, each of currents corresponding to a U phase, a V phase, a W phase, and common, respectively, is supplied to a separate one of the four land portions 436. Each land portion 436 is arranged at a position radially outside a separate one of the outlets 434 and overlapping with a separate one of the cuts 63 in the plan view.

The coils 72 are defined by conducting wires used for the U phase, the V phase, the W phase, and the common. Referring to FIG. 3, a conducting wire 721 extending from any one of the coils 72 is drawn out downwardly beyond the lower surface of the circuit board 43 through a corresponding one of the outlets 434 and a corresponding one of the cuts 63. An end portion of each conducting wire 721 is soldered to a corresponding one of the land portions 436 radially outside the inclined portion 433. A solder portion 437 is defined as a result of this soldering, and the solder portion 437 is closely adhered to the land portion 436 while covering the end portion of the conducting wire 721. As a result, electrical connection between the land portion 436 and the conducting wire 721 is achieved.

As described above, in the motor 10, the conducting wires 721 are connected to the respective land portions 436 of the circuit board 43 without being drawn outward beyond an outer circumferential end portion of the base plate 41.

Moreover, referring to FIG. 3, each of the solder portion 437 and the end portion of the conducting wire 721 covered with the solder portion 437 is arranged at a level higher than that of a lower surface of the inner bottom plate portion 411. As a result, the axial position of each of the solder portion 437 and the end portion of the conducting wire 721 at least partially overlaps with the axial position of the junction portion 414. This contributes to effective use of a space in the axial direction. This in turn contributes to reducing the axial thickness of the motor 10.

In particular, in the present preferred embodiment, both the solder portion 437 and the end portion of the conducting wire 721 are arranged in the cut 63. This contributes to preventing an electrical connection between the land portion 436 and the base plate 41. Moreover, the axial position of each of the solder portion 437 and the conducting wire 721 at least partially overlaps with the axial position of the elevated portion 412, and this contributes to more effective use of the space in the axial direction.

Furthermore, radially outside each cut 63, one of the lower air holes 62 extends more widely than the cut 63. Accordingly, not only the cut 63 but also the lower air hole 62 can be used for arrangement of a jig for soldering. The soldering operation can therefore be accomplished more easily than in the case where the cut 63 and the lower air hole 62 are separated from each other.

Furthermore, in the present preferred embodiment, each outlet 434, through which the conducting wire 721 is passed, is defined in the inclined portion 433 of the circuit board 43. In addition, a portion of each cut 63 through which the conducting wire 721 is passed is located in the junction portion 414 of the base plate 41. Each of the inclined portion 433 and the junction portion 414 is arranged to extend obliquely so as to cross a straight route between the coil 72 and the land portion 436. This reduces the likelihood that the conducting wire 721 will make contact with an edge of the outlet 434 or an edge of the cut 63. Moreover, even if the conducting wire 721 makes contact with the edge of the outlet 434 or the edge of the cut 63, the likelihood that this contact will cause a stress concentration is low. The likelihood that the conducting wire 721 will be damaged is therefore low.

Furthermore, in the present preferred embodiment, the inner board portion 431 is arranged to extend along the upper surfaces of the elevated portion 412 and the inner bottom plate portion 411. In addition, an upper surface of a portion of the inner board portion 431 which is arranged on the upper surface of the inner bottom plate portion 411 is arranged at a level lower than that of an upper surface of a portion of the inner board portion 431 which is arranged on the upper surface of the elevated portion 412. This arrangement contributes to widening a space for the coils 72. Moreover, lowering of the axial position of each coil 72 contributes to an additional reduction in the axial thickness of the motor 10.

In particular, in the present preferred embodiment, the elevated portion 412 is arranged radially outward of the coils 72. Therefore, each coil 72 and the elevated portion 412 do not restrict the axial position of each other. This contributes to an additional reduction in the axial thickness of the motor 10.

However, an excessive difference in level between the inner bottom plate portion 411 and the elevated portion 412 may restrict the reduction in the thickness of the motor 10. Therefore, in the present preferred embodiment, a difference in level between the upper surface of the inner bottom plate portion 411 and the upper surface of the elevated portion 412 is arranged to be smaller than the axial dimension of the solder portion 437 to avoid an unnecessarily large difference in level between the inner bottom plate portion 411 and the elevated portion 412. This contributes to reducing the axial thickness of the motor 10.

Furthermore, in the present preferred embodiment, each cut 63 is arranged to extend from one of the lower air holes 62 to a space below the inner board portion 431. As a result, a portion of an edge portion of the inner board portion 431 defines a portion of an edge of the lower air hole 62. During the rotation of the impeller 20, not only a gas existing under each lower air hole 62 but also a gas existing in each cut 63 is drawn into the casing 30 through the lower air hole 62. An increase in the amount of gas drawn into the casing 30 is thereby achieved.

Furthermore, referring to FIG. 4, in the present preferred embodiment, the elevated portion 412 of the base plate 41 is annular in shape. The elevated portion 412 thus includes a portion arranged adjacent to an inner end portion of the outer board portion 432. This results in an uneven surface in the vicinity of an inner end portion of the first rib 81. This leads to an improved rigidity of a portion of the first rib 81 in the vicinity of the inner end portion of the first rib 81. Furthermore, referring to FIGS. 4 and 5, each of the two second ribs 82 of the base plate 41 according to the present preferred embodiment includes a different level portion 821 arranged to project or to be recessed in the axial direction. This contributes to increasing the rigidity of the two second ribs 82.

An improvement in the rigidity of the base plate 41 makes it possible to reduce the axial thickness of the base plate 41. This contributes to reducing the axial thickness of the motor 10.

3. Example Modifications

While preferred embodiments of the present invention have been described above, it is to be understood that the present invention is not limited to the above-described preferred embodiments.

Figure 6:
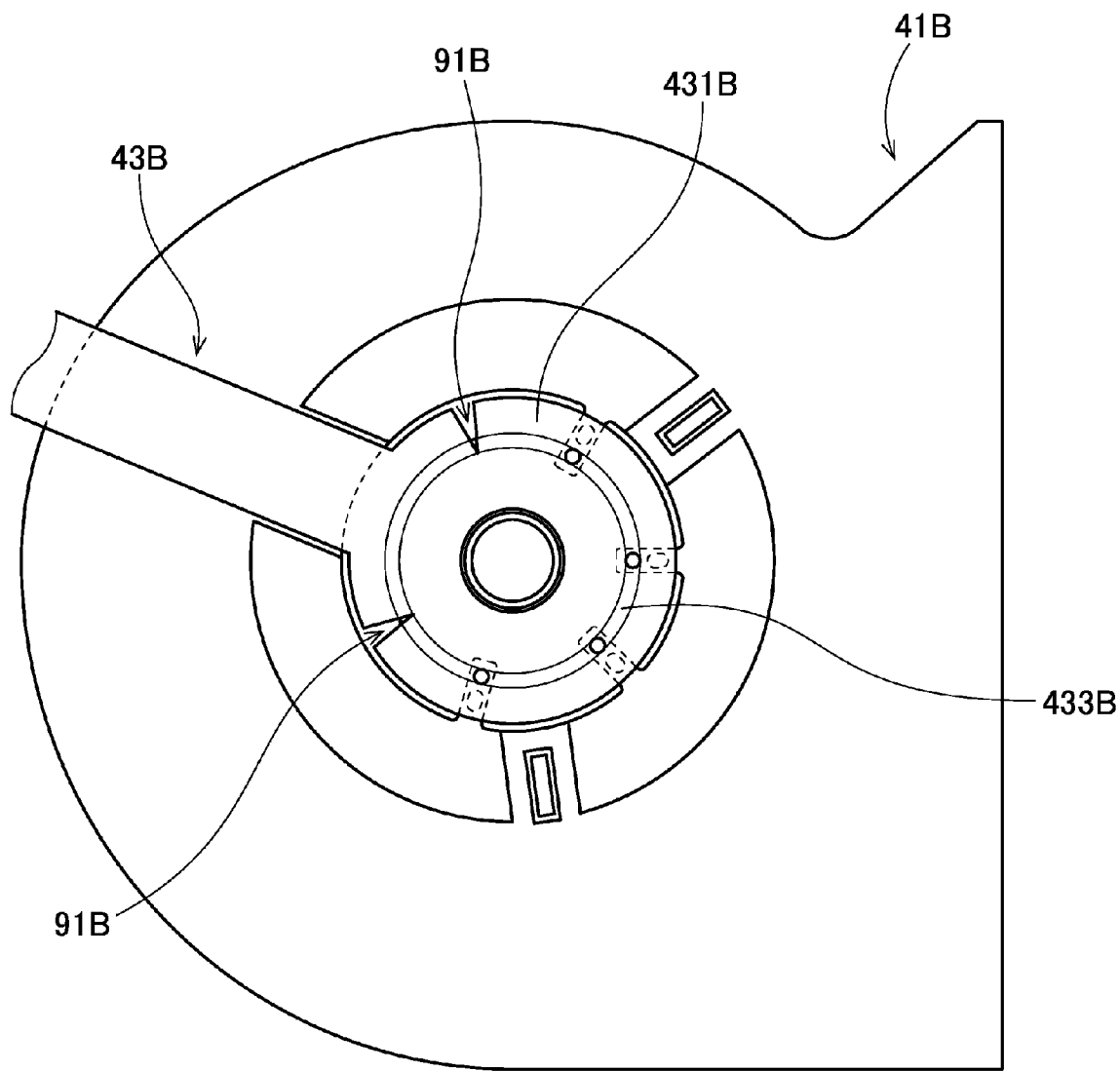

FIG. 6 is a top view of a base plate 41B and a circuit board 43B according to a modification of the second preferred embodiment. In the modification illustrated in FIG. 6, an inner board portion 431B includes slits 91B each of which is arranged to extend radially inward from a radially outer edge portion of the inner board portion 431B up to an inner end of an inclined portion 433B. This enables the inner board portion 431B to be more stably arranged on an upper surface of the base plate 41B, which is not flat. That is, the likelihood that a gap will be defined between an upper surface of an elevated portion and the inner board portion 431B when the circuit board 43B is arranged using an upper surface of an inner bottom plate portion as a base surface is reduced. This contributes to reducing the axial thickness of a motor.

Figure 7:
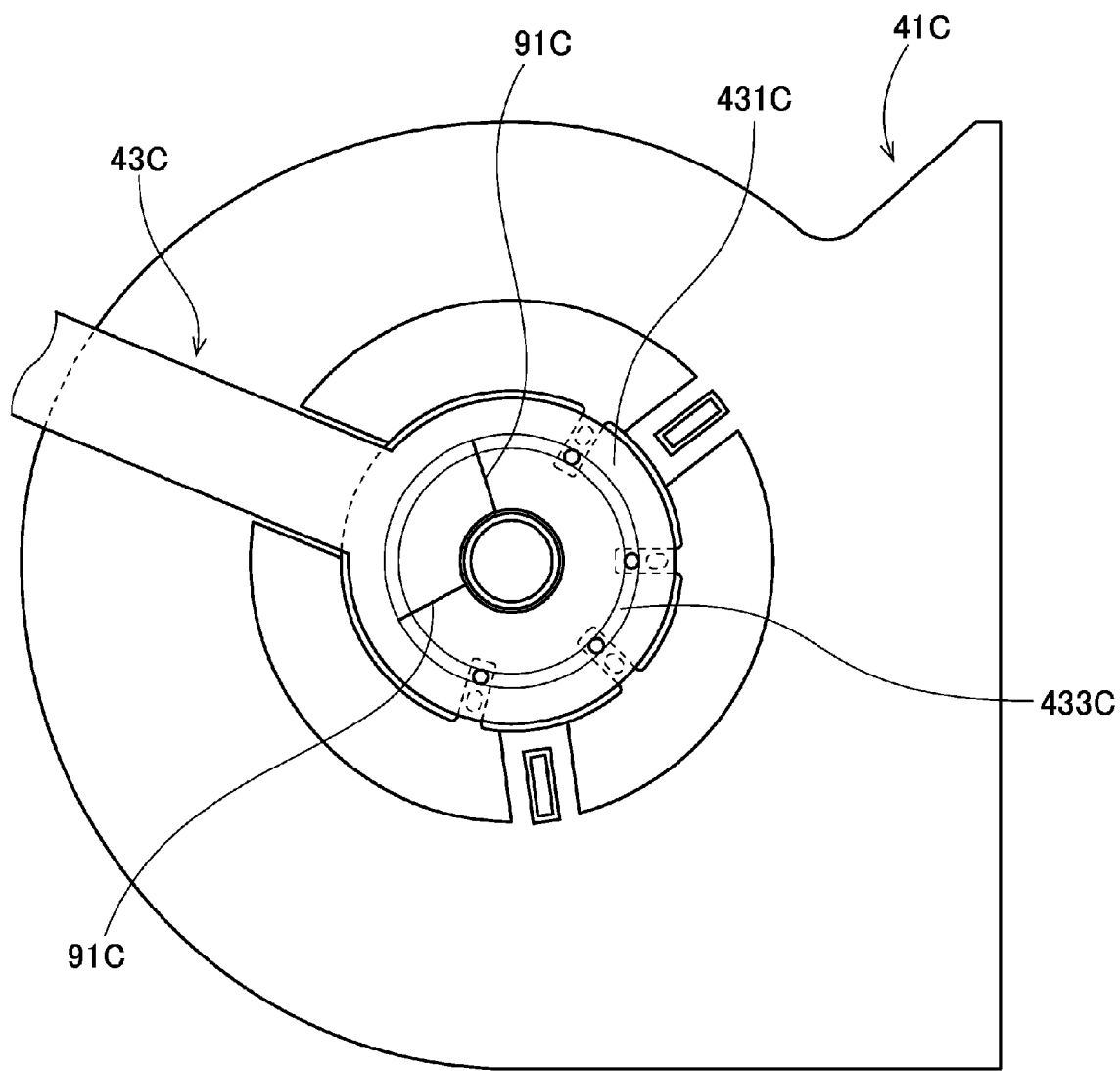

FIG. 7 is a top view of a base plate 41C and a circuit board 43C according to a modification of the second preferred embodiment. In the modification illustrated in FIG. 7, an inner board portion 431C includes slits 91C each of which is arranged to extend radially outward from a radially inner edge portion of the inner board portion 431C up to an outer end of an inclined portion 433C. This enables the inner board portion 431C to be more stably arranged on an upper surface of the base plate 41C, which is not flat. That is, the likelihood that a gap will be defined between an upper surface of an inner bottom plate portion and the inner board portion 431C when the circuit board 43C is arranged using an upper surface of an elevated portion as a base surface is reduced. This contributes to reducing the axial thickness of a motor.

Figure 8:
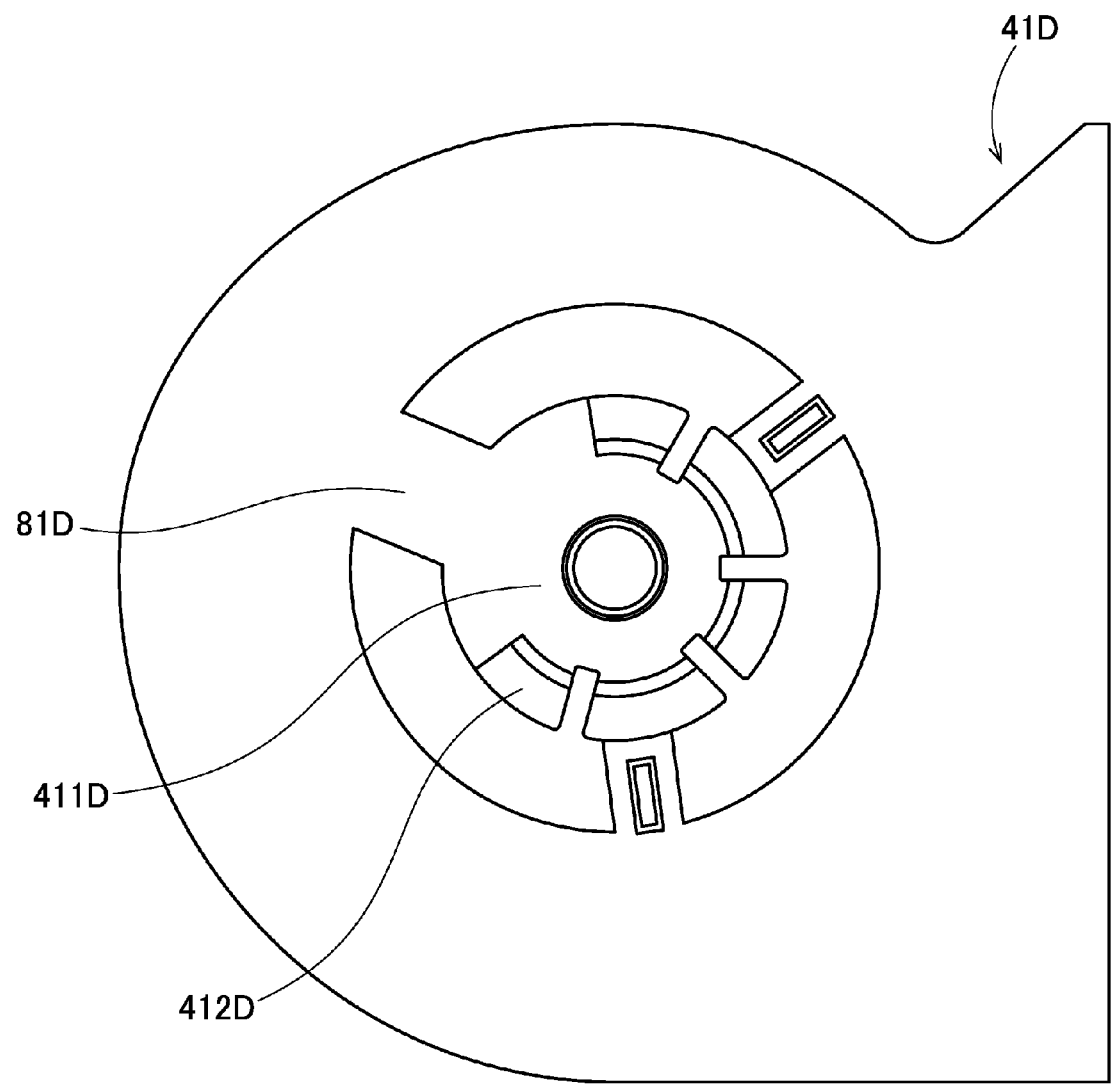

FIG. 8 is a top view of a base plate 41D according to a modification of the second preferred embodiment. In the modification illustrated in FIG. 8, an elevated portion 412D is not arranged to extend in a perfectly annular shape although the elevated portion 412D has a large circumferential extent. No portion of the elevated portion 412D is arranged between an inner bottom plate portion 411D and a first rib 81D. As a result, a flat area without unevenness extends between an upper surface of the inner bottom plate portion 411D and an upper surface of the first rib 81D. This flat area facilitates arrangement of electronic components on a circuit board.

Figure 9:
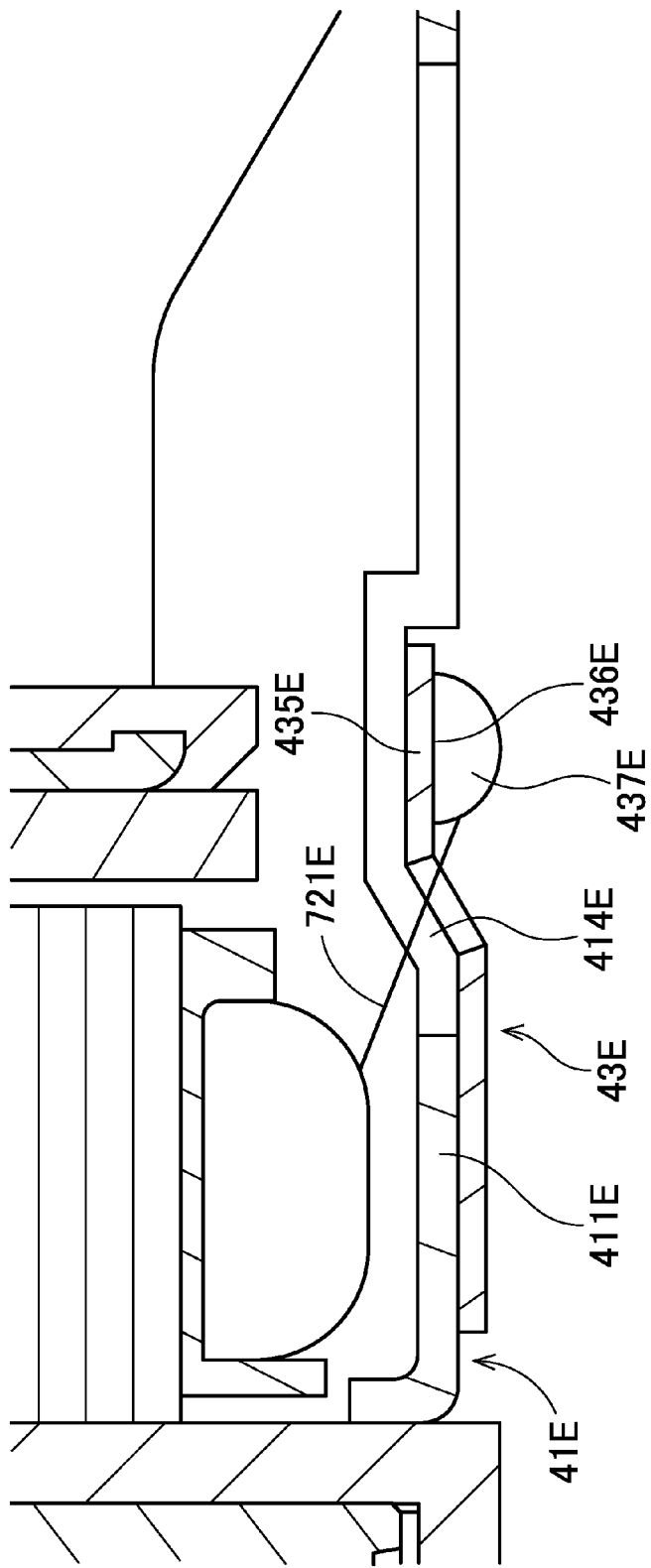
FIG. 9 is a partial vertical cross-sectional view of a centrifugal fan according to a modification of the second preferred embodiment.

FIG. 9 is a partial vertical cross-sectional view of a centrifugal fan according to a modification of the second preferred embodiment. In the modification illustrated in FIG. 9, a circuit board 43E is arranged on a lower surface of a base plate 41E. A land portion 436E is arranged on a lower surface of an upper plate portion 435E of the circuit board 43E. At least a portion of each of a solder portion 437E and an end portion of a conducting wire 721E covered with the solder portion 437E is arranged at a level higher than that of a lower surface of an inner bottom plate portion 411E. As a result, the axial position of each of the solder portion 437E and the end portion of the conducting wire 721E at least partially overlaps with the axial position of a junction portion 414E. This contributes to effective use of a space in the axial direction. This in turn contributes to reducing the axial thickness of a motor.

However, it is preferable that the inner board portion 431 should be arranged to intervene between the coils 72 and the inner bottom plate portion 411 as in the above-described second preferred embodiment, because, in this case, the inner board portion 431 serves to prevent an electrical connection between the base plate 41 and each of the coils 72 and the conducting wires 721.

Figure 10:
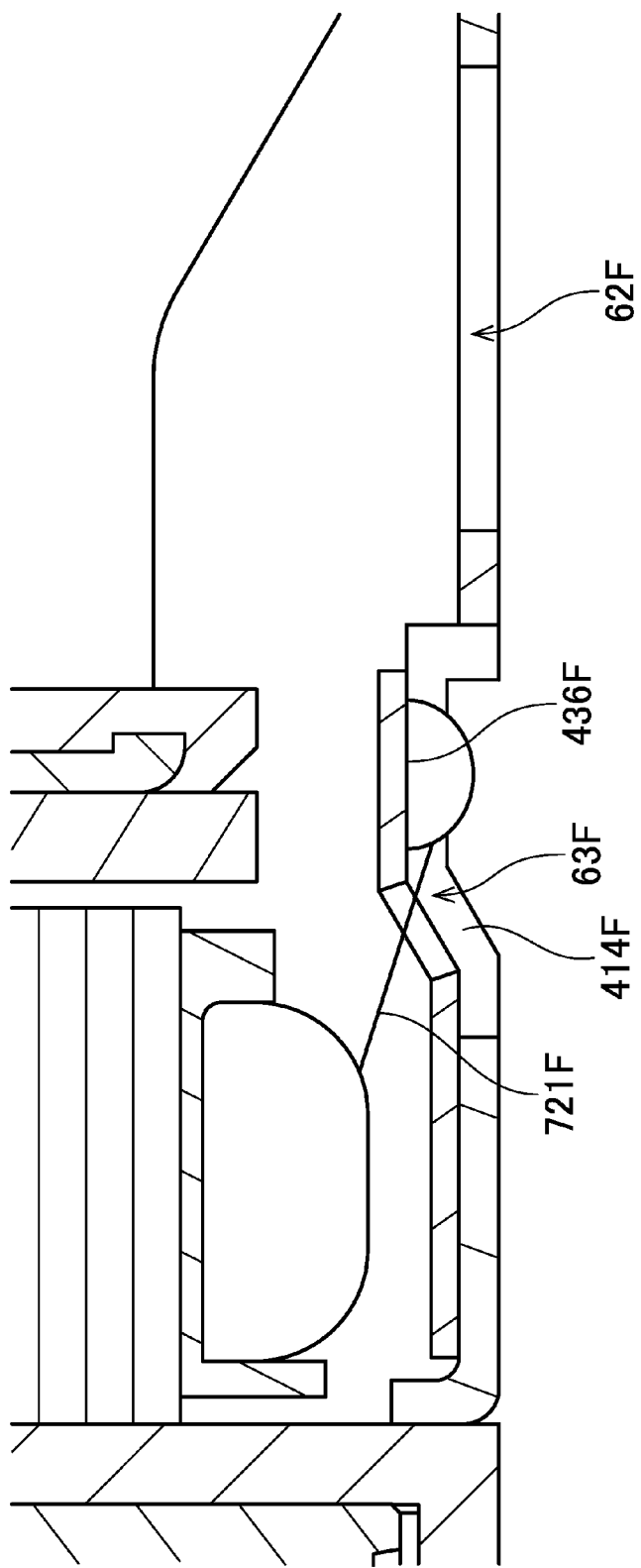
FIG. 10 is a partial vertical cross-sectional view of a centrifugal fan according to a modification of the second preferred embodiment.

FIG. 10 is a partial vertical cross-sectional view of a centrifugal fan according to a modification of the second preferred embodiment. In the modification illustrated in FIG. 10, in place of the cut, a through hole 63F separated from a lower air hole 62F is arranged radially inside the lower air hole 62F. A conducting wire 721F is drawn out through this through hole 63F. In addition, the conducting wire 721F is soldered to a land portion 436F in the through hole 63F. As described above, the through hole 63F through which the conducting wire is passed may be separated from the lower air hole. It is enough that the through hole 63F should be arranged to pass through at least a portion of a junction portion 414F in the axial direction.

Figure 11:
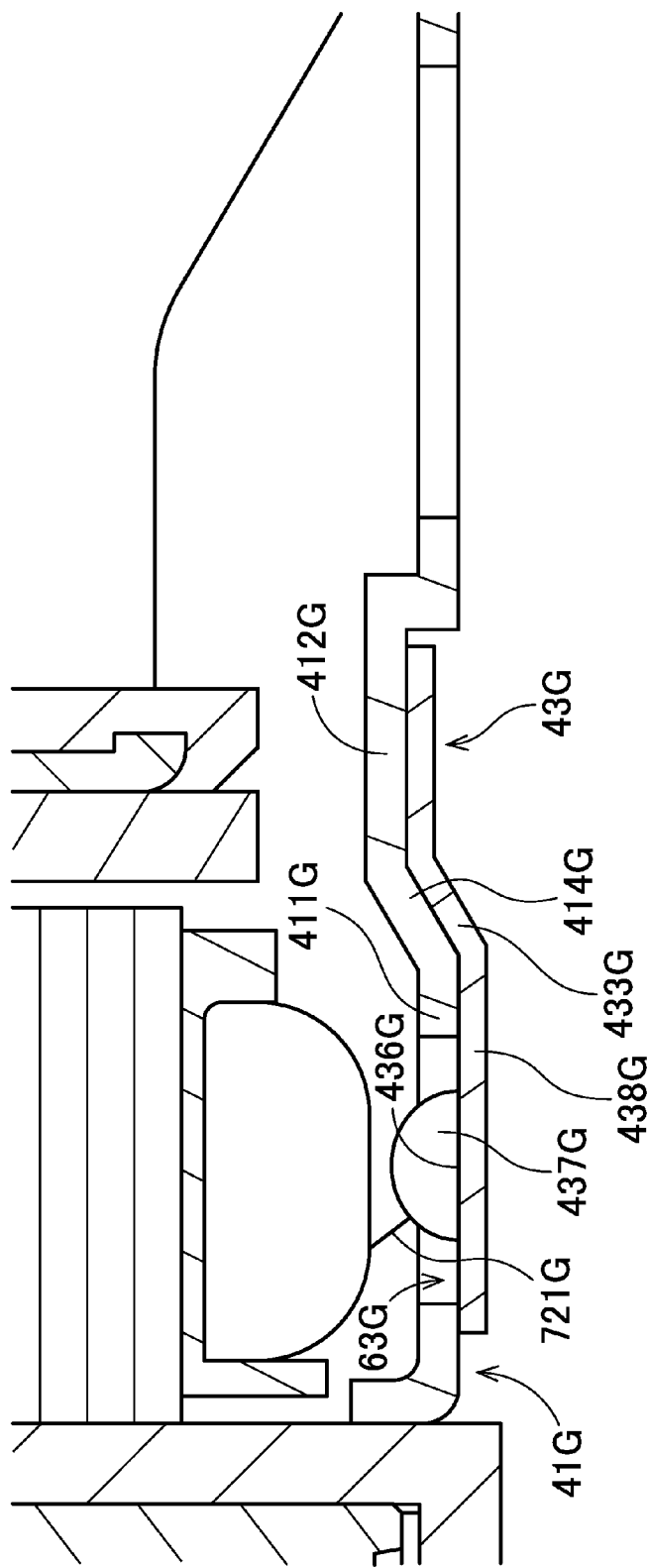
FIG. 11 is a partial vertical cross-sectional view of a centrifugal fan according to a modification of the second preferred embodiment.

FIG. 11 is a partial vertical cross-sectional view of a centrifugal fan according to a modification of the second preferred embodiment. In the modification illustrated in FIG. 11, a circuit board 43G is arranged on a lower surface of a base plate 41G. The circuit board 43G includes a lower plate portion 438G arranged to extend radially inward from a radially inner edge portion of an inclined portion 433G. The lower plate portion 438G is arranged to overlap with an inner bottom plate portion 411G in a plan view. A land portion 436G is arranged on an upper surface of the lower plate portion 438G. The land portion 436G is arranged at a position overlapping with a through hole 63G in the plan view.

In the modification illustrated in FIG. 11, each of a solder portion 437G and an end portion of a conducting wire 721G which is covered with the solder portion 437G is arranged at a level lower than that of an upper surface of an elevated portion 412G. As a result, the axial position of each of the solder portion 437G and the end portion of the conducting wire 721G at least partially overlaps with the axial position of a junction portion 414G. This contributes to effective use of a space in the axial direction. This in turn contributes to reducing the axial thickness of a motor.

Figure 12:
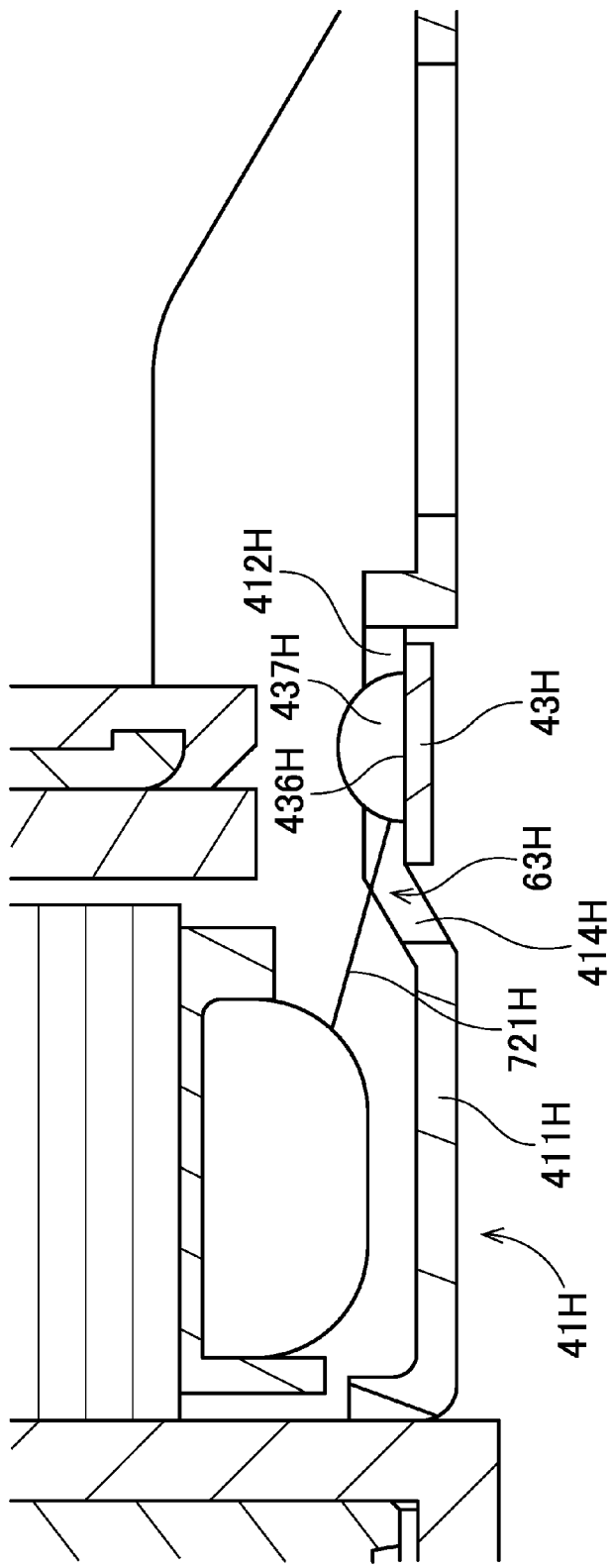
FIG. 12 is a partial vertical cross-sectional view of a centrifugal fan according to a modification of the second preferred embodiment.

FIG. 12 is a partial vertical cross-sectional view of a centrifugal fan according to a modification of the second preferred embodiment. In the modification illustrated in FIG. 12, a circuit board 43H is arranged on a lower surface of an elevated portion 412H of a base plate 41H. That is, the elevated portion 412H and the circuit board 43H are arranged to overlap with each other in a plan view. In addition, a land portion 436H is arranged on an upper surface of the circuit board 43H. The base plate 41H includes a through hole 63H arranged to pass through at least a portion of a junction portion 414H in the axial direction. A conducting wire 721H is soldered to the land portion 436H in the through hole 63H.

Also in the modification illustrated in FIG. 12, the axial position of each of a solder portion 437H and an end portion of the conducting wire 721H at least partially overlaps with the axial position of the junction portion 414H. This contributes to effective use of a space in the axial direction. This in turn contributes to reducing the axial thickness of a motor. Moreover, in the modification illustrated in FIG. 12, an inner end portion of the circuit board 43H is arranged radially outward of an outer end portion of an inner bottom plate portion 411H. Accordingly, the entire circuit board 43H is arranged at a level higher than that of a lower surface of the inner bottom plate portion 411H. This contributes to further reducing the axial thickness of the motor.

FIG. 13 is a partial vertical cross-sectional view of a centrifugal fan according to a modification of the second preferred embodiment. In the modification illustrated in FIG. 13, a base plate 41J includes no shoulder caused by a difference in level between the inner bottom plate portion and the elevated portion. However, in this modification, the axial position of an end portion of a conducting wire 721J which is connected to a land portion 436J is arranged to at least partially overlap with the axial position of a cut 63J defined in the base plate 41J. This contributes to effective use of a space in the axial direction. This in turn contributes to reducing the axial thickness of a motor.

The circuit board may be either the flexible printed circuit board as in each of the above-described preferred embodiments and the modifications thereof, or a rigid board, such as a glass epoxy board. However, use of the flexible printed circuit board makes it possible to reduce the axial thickness of the circuit board itself. Therefore, the use of the flexible printed circuit board is preferable because a reduction in the axial thickness of the motor is thereby achieved.

The elevated portion is preferably arranged to at least partially overlap with the magnet(s) in the plan view. In addition, the elevated portion is preferably arranged radially inward of a radially inner end portion of the impeller in the plan view. Moreover, each land portion is preferably arranged to at least partially overlap with the magnet(s) in the plan view. Furthermore, each land portion is preferably arranged radially inward of the radially inner end portion of the impeller in the plan view. The above arrangements enable a radially inner end portion of each lower air hole to be arranged at a position partially overlapping with the radially inner end portion of the impeller in the plan view. An increase in the size of each lower air hole improves an air volume characteristic of the fan.

Note that the number of air holes, the number of cuts, the number of outlets, and the number of land portions may be different from those according to the above-described second preferred embodiment and the modifications thereof. Specifically, the number of air holes may be one, two, or more than three. Each of the number of cuts, the number of outlets, and the number of land portions may be one, two, three, or more than four.

Note that a fan according to a preferred embodiment of the present invention may be a centrifugal fan arranged to send a gas radially outward as in each of the above-described preferred embodiments and the modifications thereof, or an axial fan arranged to send a gas in the axial direction. Also note that each air hole defined in the base plate may be a hole used for discharge of a gas. Also note that motors according to preferred embodiments of the present invention may be installed in devices other than fans. For example, a motor according to a preferred embodiment of the present invention may be a spindle motor installed in a hard disk drive, or a motor used to generate a driving force for a power steering of an automobile.

Note that the detailed structures of motors and fans according to preferred embodiments of the present invention may be different from the structures of the motors and the fans according to the above-described preferred embodiments and the modifications thereof as illustrated in the accompanying drawings of the present application. For example, instead of a fluid dynamic bearing, a bearing of another type, such as a plain bearing, may be used as a bearing mechanism of a motor according to a preferred embodiment of the present invention.

Also note that features of the above-described preferred embodiments and the modifications thereof may be combined appropriately as long as no conflict arises.

The present invention is applicable to motors and fans.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fan comprising:
a motor
an impeller arranged to rotate together with a rotating portion of the motor; and
a casing arranged to accommodate the rotating portion and the impeller; and
wherein the motor comprises:
a stationary portion; and
a rotating portion supported by the stationary portion through a bearing mechanism, and arranged to rotate about a central axis extending in a vertical direction; wherein
the rotating portion includes a magnet in which magnetic poles are arranged in a circumferential direction, or a plurality of magnets arranged in the circumferential direction;
the stationary portion includes:
an armature including coils arranged around the central axis;
a base plate arranged below the armature to support the bearing mechanism; and
a circuit board arranged on an upper surface or a lower surface of the base plate;
the base plate comprising:
an inner bottom plate portion arranged to extend in directions away from the central axis below the armature;
an elevated portion arranged to extend in the directions away from the central axis radially outside and above the inner bottom plate portion;
a junction portion arranged to join an outer edge of the inner bottom plate portion and an inner edge of the elevated portion to each other; and
an air hole passing through the base plate in the axial direction radially outside the elevated portion, the air hole having a through hole portion inwardly extending to reach the inner bottom plate portion such that the through hole portion partially passes through the junction portion;
the circuit board provided on the base plate, the circuit board comprising:
a land portion arranged on a lower surface of the circuit board, on the elevated portion, and radially outside the armature, wherein a conducting wire extending from the coils is electrically connected to the land portion;
an inclined portion arranged above the junction portion; and
an outlet passing through the inclined portion in the axial direction;
wherein the land portion and the through hole portion are arranged to overlap with each other in the axial direction,
wherein the conducting wire is drawn from the coils radially outward beyond the inclined portion through the outlet and the through hole portion to be connected to the land portion.

2. The fan according to claim 1, wherein the circuit board is a flexible printed circuit board.

3. The fan according to claim 1, wherein
the circuit board is arranged on the upper surface of the base plate; and
the circuit board is arranged to intervene between the coils and the inner bottom plate portion.

4. The fan according to claim 3, wherein
the circuit board is arranged to extend along an upper surface of the inner bottom plate portion and an upper surface of the elevated portion; and
an upper surface of a portion of the circuit board which is arranged on the upper surface of the inner bottom plate portion is arranged at a level lower than that of an upper surface of a portion of the circuit board which is arranged on the upper surface of the elevated portion.

5. The fan according to claim 4, wherein the elevated portion is arranged radially outward of the coils.

6. The fan according to claim 1, wherein
the circuit board includes an inner board portion arranged to have a large circumferential extent, and arranged on upper or lower surfaces of the inner bottom plate portion and the elevated portion; and
the inner board portion includes a slit arranged to extend radially inward from a radially outer edge portion thereof, or a slit arranged to extend radially outward from a radially inner edge portion thereof.

7. The fan according to claim 1, wherein
the stationary portion includes a solder portion closely adhered to the land portion, and arranged to cover an end portion of the conducting wire; and
a difference in level between an upper surface of the inner bottom plate portion and an upper surface of the elevated portion is arranged to be smaller than an axial dimension of the solder portion.

8. The fan according to claim 1, wherein a portion of an edge portion of the circuit board is arranged to define a portion of an edge of the air hole.

9. The fan according to claim 1, wherein
the base plate includes:
a plurality of air holes with ribs arranged in the circumferential direction; and
an outer bottom plate portion arranged to extend in the directions away from the central axis radially outside and below the elevated portion;
the circuit board includes an outer board portion arranged to extend radially outward from an inner end of one of the ribs; and
the elevated portion includes a portion arranged adjacent to an inner end portion of the outer board portion.

10. The fan according to claim 9, wherein
the ribs include:
a first rib arranged to have the outer board portion arranged thereon; and
a second rib arranged to be away from the outer board portion; and
the second rib is arranged to have a circumferential width smaller than that of the first rib.

11. The fan according to claim 9, wherein
the ribs include:
a first rib arranged to have the outer board portion arranged thereon; and
a second rib arranged to be away from the outer board portion; and
the second rib includes a different level portion arranged to project or to be recessed in the axial direction.

* * * * *